United States Patent [19]

Parr

[11] 4,194,589
[45] Mar. 25, 1980

[54] VALVE

[76] Inventor: Erwin W. Parr, 3001 McKinley, Des Moines, Iowa 50315

[21] Appl. No.: 914,542

[22] Filed: Jun. 12, 1978

[51] Int. Cl.² .............................................. B60R 27/00
[52] U.S. Cl. .................................... 180/271; 108/54 B; 137/543.21
[58] Field of Search .................. 180/82 R, 54 B, 271; 137/543.21, 198, 199, 215, 537, 511, 540, 543.15; 123/136, 139 AV

[56] References Cited

U.S. PATENT DOCUMENTS

| | | | |
|---|---|---|---|
| 3,463,185 | 8/1969 | Oliver et al. | 137/543.21 X |
| 3,548,868 | 12/1970 | Mullaney | 137/543.21X |
| 4,040,404 | 8/1977 | Tagawa | 123/136 |
| 4,129,144 | 12/1978 | Andersson et al. | 137/543.21 X |

FOREIGN PATENT DOCUMENTS 1371514  10/1974  United Kingdom ................ 137/543.21

*Primary Examiner*—Robert R. Song
*Assistant Examiner*—Norman L. Stack, Jr.
*Attorney, Agent, or Firm*—Henderson & Sturm

[57] ABSTRACT

A valve for use in a vehicle fuel line between a fuel tank and a fuel pump for preventing fluid from flowing from the fuel tank to the carburetor of an engine when the fuel pump is not functioning and for allowing such fuel to pass through the fuel line to the fuel pump and carburetor when the fuel pump is in operation. A valve assembly within a chamber of the valve is biased to a closed position, but is movable to an open position in response to a suction effect from the fuel pump. The valve assembly includes a novel structure for insuring a positive seal when the valve is closed.

6 Claims, 4 Drawing Figures

U.S. Patent    Mar. 25, 1980    4,194,589
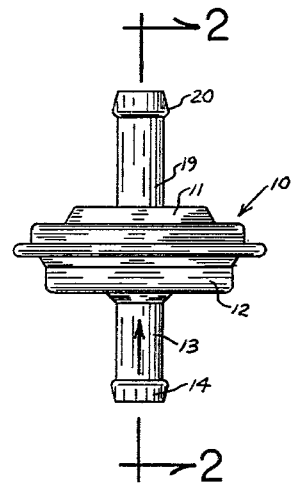
FIG. 1
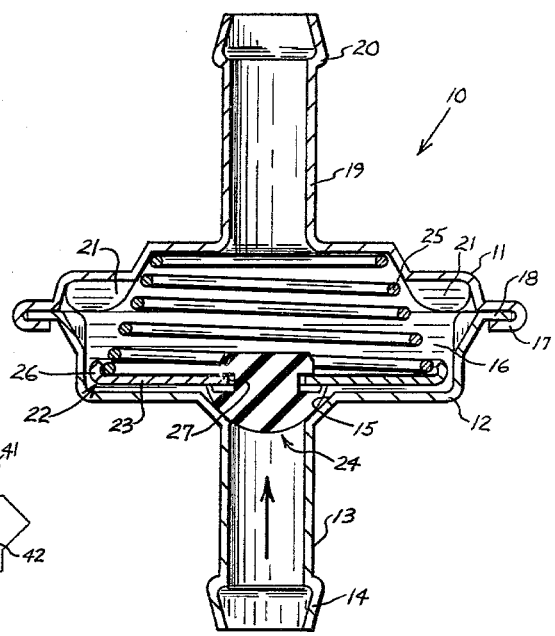
FIG. 2
FIG. 4
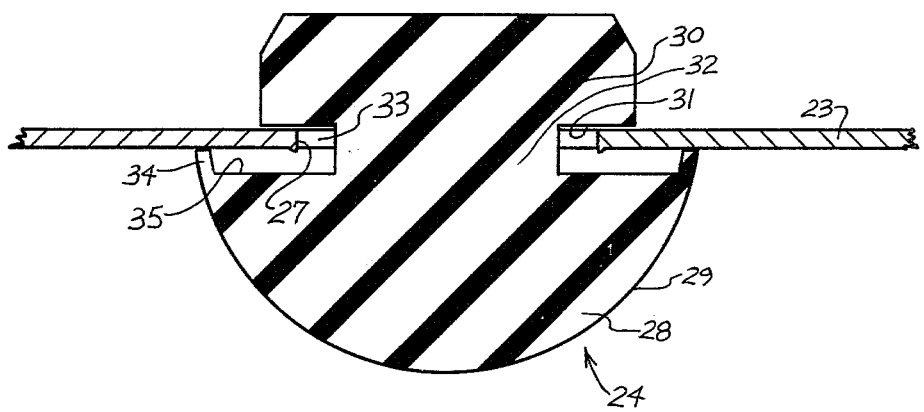
FIG. 3

VALVE

BACKGROUND OF THE INVENTION

The present invention relates generally to valves and more particularly to a valve for use in an automotive fuel line to prevent excessive fuel from passing to the carburetor and ultimately to the catalytic converter.

With the advent of the necessity to have catalytic converters on practically all internal combustion engine driven vehicles, certain problems have developed. One of the major problems relates to the transporting of such vehicles for delivery to dealers or other buyers of such vehicles. It has been determined that quite often in the shipping of such vehicles, such as on trains or trucks, after arrival at its destination that when the vehicle engine is started, a fire starts in the catalytic converter. This first can be intensive enough, even though initially confined to the catalytic converter, to burn out the carpeting in such vehicle and in some cases start the entire vehicle on fire.

The cause of this problem has been determined to be that during shipping, excessive amounts of fuel pass from the fuel tank to the carburetor and ultimately to the catalytic converter. Then once the vehicle is started this fuel is ignited in the catalytic converter, there is no practical way to extinguish it except by waiting for it to burn itself out, which is quite often too late to prevent the aforementioned types of damage to the vehicle.

Consequently, there is a need for something to prevent too much fuel from passing from the fuel tank to the carburetor during the shipping of vehicles. One simple approach would be to place a valve in the fuel line between the fuel tank and the carburetor. One way check valves which open in response to pressure from the fuel pump have been determined to be a viable approach to solving this problem, but at least one major U.S. automobile manufacturer has determined that the performance of available valves is such that it would be preferable to have the car dealers remove such valves before they are sold and delivered to the customer for use.

Consequently, there is a need for a check valve for this use with performance characteristics which obviate the need for removal from the fuel line.

SUMMARY OF THE INVENTION

The present invention relates to a valve for use in a fuel line of an automotive vehicle between a fuel tank and an engine fuel pump and being dependent upon the operation of the fuel pump to maintain the valve open. The valve is biased to a closed position and returns to such closed position when the fuel pump is not in operation. The valve body includes a housing having a sealed chamber therein, an inlet port, an outlet port and a frusto-conical valve seat. A valve seat assembly within the chamber includes a plate extending across the chamber with one side of the plate facing the inlet port and one side facing the outlet port. An opening is disposed in the plate and a resilient member is disposed through the opening. A first portion of the resilient member, larger than the opening, extends on one side of the plate and has a partially spherical surface thereon for engagement with the valve seat. A second portion of the resilient member, larger than the opening in the plate, is disposed on the other side of the plate, and a third and central portion of the resilient member, smaller than the opening, connects the first and second portions together and allows lateral shifting of the resilient member to facilitate positive sealing even if the plate is not axially aligned with the valve seat.

An object of the present invention is to provide an apparatus for preventing fires in catalytic converters.

Another object is to provide a one way valve with improved sealing characteristics.

Other objects, advantages and novel features of the present invention will become apparent from the following detailed description of the invention when considered in conjunction with the accompanying drawings.

BRIEF DESCRIPTION OF THE DRAWINGS

FIG. 1 is a side elevational view of the valve of the present invention;

FIG. 2 is a cross sectional view taken along line 2—2 of FIG. 1;

FIG. 3 is a partial, enlarged cross sectional view, like FIG. 2, but showing only the central portion of the valve assembly; and FIG. 4 is a schematic view of the valve as installed in an internal combustion engine powered vehicle.

DETAILED DESCRIPTION OF THE PREFERRED EMBODIMENT

Referring now to the drawings wherein like reference numerals designate identical or corresponding parts throughout the several views, FIG. 1 shows a valve 10 constructed in accordance with the present invention. The valve 10 includes a housing having a first part 11 and a second part 12.

The parts 11 and 12 are generally circular when viewed from the ends thereof. The part 12 includes an inlet port tube 13 and an end tube connector 14. A frusto-conical valve seating surface 15 is formed at the inlet to a chamber formed within the housing of the valve. A lip 17 on part 11 is sealingly clamped around a flange 18 on housing part 12.

An outlet tube is integrally formed on the housing part 11 and includes a tube connector portion 20 on one end thereof. A plurality of indentations 21 around the top of housing part 11 form stops for the valve assembly as will be discussed below.

A valve assembly 22 is reciprocally disposed within the chamber 16. The valve assembly 22 includes a circular-shaped plate member 23 and a resilient member 24. A compression spring 25 biases the valve assembly 24 to the closed position as shown in FIG. 2 by contact with the downstream side of the plate 23 inside of the flange and in further abutting contact with the inside of housing part 11.

The plate 23 includes a central circular opening 27 for reception of the resilient member 24. The resilient member 24 includes a first portion 28 which is larger than the opening 27 in the plate 23 and includes a partially spherical surface 29 thereon. A second portion 30 of the resilient member 24 is larger than the opening 27 in the plate 23, but is capable of being forced through the opening 27 so that the resilient member 24 can be installed onto or removed from the plate 23. A planer surface 31 on the resilient portion 30 abuts a portion of the downstream side of the plate 23.

A third portion 32, of the resilient member 24, is smaller than the opening 27 and connects the first portion 28 and the second portion 30 together. A substantial clearance space 33 is provided between the edge of opening 27 in plate 23 and the exterior circular surface of the third portion 32 for reasons which will be discussed below.

Referring now to FIG. 4, a vehicle fuel tank 36 is shown. The valve 10 is installed in a fuel line leading to a fuel pump 37 by means of fuel line sections 37 and 38. The fuel line section 37 connects to inlet connection 14 and the line 38 connects to outlet connection 20. The fuel pump 39 delivers fuel to the carburetor 41 through connection line 40.

When the engine 42 is running, so is the fuel pump 39, as is well known. When the engine is shut off and the fuel pump is not functioning, the pressure on each side of the valve assembly 22, tends to equalize and the spring causes the valve assembly to assume the position shown in FIG. 2. When the engine is started again, the action of the fuel pump sucks the fuel out of the chamber 16 and causes the pressure within the chamber 16 to be significantly less than the pressure within the inlet port 13. Once the pressure within chamber 16 has reduced significantly, the bias of the spring 25 will be overcome and the valve will open; that is, the valve assembly 22 will move from the position shown in FIG. 2 to a position (not shown) in which the flange 26 abuts the stops 21. It is important to have stops 21, because otherwise a seal could form between the annular flange 26 and the top of housing part 11, which would hold the valve open even when the fuel pump was shut off.

The valve assembly 22 fits very loosely in the housing and is guided loosely by the interior of body part 12. The flow of fuel passes into part 13, past valve seat 15, around the periphery of flange 26, into chamber 16 and then out the outlet port 19, when the valve is open. Because of the loose fitting nature of plate 23 within the housing chamber 16, it is almost impossible for it to be jammed and prevented from freely operating in a reciprocal fashion as it is designed to operate. The major problem associated with such a design is that it is difficult to achieve positive sealing when such valve plate can freely move laterally to some degree such that the axis of the valve seat 15 is displaced from the axis of the plate 23. Likewise, the plate can twist to some degree within the housing such that the axis of the plate is not parallel with the axis of the valve seat 15. The resilient member 24 has accordingly been designed to compensate for such deviations of movement of the valve assembly 22. This is believed to be preferable to an approach of trying to limit the deviation of movement of the plate, which approach is likely to cause the valve assembly 22 to stick or jam.

If the valve assembly begins to close, for example due to the shutting off of the engine 42 and fuel pump 39, and the plate 23 is not concentrically aligned within the housing part 12; that is, if the axis of the plate 23 and the axis of the seat 15 are not in alignment, even though they could be parallel, then the resilient member 24 will shift within the opening 27 in the plate 23 to tend to align the axis of the resilient member 24 with the axis of the seat 15.

If the valve assembly is cocked to one side during closing such that the axis of the resilient member 24 and plate 23 is not aligned with and is not parallel to the axis of the valve seat 15, positive sealing will still occur because of the spherical shape of te surface 29 of the resilient member 24.

A lip 34 is provided on the resilient member 24 for holding the surface 30 against the plate 23 and causing a tight seal to be formed between the plate member 23 and the first portion 28 of the resilient member 24, thereby preventing flow between member 24 and the plate 23 through opening 27, and forcing all flow that around the periphery of plate 23 when the valve 10 is open and preventing all flow through the valve 10 when it is closed.

Consequently, it is clear that the disclosed embodiment does indeed fulfill the objects set forth above. Accordingly, many modifications and variations of the present invention are possible in light of the above teachings. It is therefore to be understood that, within the scope of the appended claims, the invention may be practiced otherwise than as specifically described.

I claim:

1. In combination with an automotive vehicle having a fuel tank and an engine, fuel supply conduit means connected to said tank, a fuel pump driven by said engine and located in said conduit means for pumping fuel from said tank for use by said engine and valve means connected in said fuel line between said fuel pump and said fuel tank dependent upon operation of said pump to open said fuel conduit means, said valve means comprising:

a housing having a sealed chamber therein;

inlet port means connected to said housing and to the fuel tank side of said conduit means;

a circular valve seat disposed in said chamber surrounding said inlet port means;

outlet port means connected to said housing and to the fuel pump side of said conduit means;

a valve assembly disposed within said chamber, said valve assembly comprising:

a plate extending substantially across said chamber, one side of said plate facing said inlet port means and the other side of said plate forming said outlet port means;

an opening having an axis disposed in said plate and resilient means disposed through said opening, said resilient means comprising a first portion extending on the inlet side of said plate, said first portion having a partially spherical surface thereon;

said first portion being larger than said opening;

a second portion, larger than said opening but capable of being resiliently forced through said opening; and a third portion smaller than said opening connecting the first portion to the second portion for allowing said resilient means to laterally shift its position with respect to the central axis of said opening and thereby facilitate positive sealing of said resilient means against said valve seat when said fuel pump is not in operation; and means for biasing said valve member against said valve seat.

2. The apparatus of claim 1 wherein said resilient means further comprises:

a lip attached to the periphery of said first portion in abutment with the inlet side of said plate for preventing flow of fuel between said plate and said resilient means.

3. The apparatus of claim 1 wherein the first portion of the resilient means includes a substantially planar surface facing said opening, and being spaced from said inlet side and a lip being attached to said first portion and being disposed around the periphery of said planar surface and extending into contact with said plate.

4. The apparatus of claim 1 wherein said circular valve seat is frusto-conical in configuration.

5. The apparatus of claim 1 wherein the periphery of said plate is spaced from the interior of the chamber to allow flow therebetween and to allow unrestricted movement of the valve assembly with respect to the housing.

6. A valve comprising:

a housing having a sealed chamber therein;

inlet port means connected to said housing;

a circular valve seat disposed in said chamber surrounding said inlet port means;

outlet port means connected to said housing;

a valve assembly disposed within said chamber, said valve assembly comprising:

a plate extending substantially across said chamber, one side of said plate facing said inlet port means and the other side of said plate forming said outlet port means;

an opening having an axis disposed in said plate and resilient means disposed through said opening, said resilient means comprising a first portion extending on the inlet side of said plate, said first portion having a partially spherical surface thereon;

said first portion being larger than said opening;

a second portion, larger than said opening but capable of being resiliently forced through said opening; and a third portion smaller than said opening connecting the first portion to the second portion for allowing said resilient means to laterally shift its position with respect to the central axis of said opening and thereby facilitate positive sealing of said resilient means against said valve seat; and means for biasing said valve member against said valve seat.

* * * * *